(12) United States Patent
Eash et al.

(10) Patent No.: US 12,032,174 B2
(45) Date of Patent: Jul. 9, 2024

(54) STEERABLE HYBRID DISPLAY USING A WAVEGUIDE

(71) Applicant: Avegant Corp., San Mateo, CA (US)

(72) Inventors: Aaron Matthew Eash, San Francisco, CA (US); Andrew John Gross, Redwood City, CA (US); Christopher David Westra, San Carlos, CA (US); Edward Chia Ning Tang, Menlo Park, CA (US); Warren Cornelius Welch, III, Foster City, CA (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 18/171,285

(22) Filed: Feb. 17, 2023

(65) Prior Publication Data
US 2023/0314826 A1     Oct. 5, 2023

Related U.S. Application Data

(63) Continuation of application No. 16/835,032, filed on Mar. 30, 2020, now Pat. No. 11,586,049.
(Continued)

(51) Int. Cl.
| G02B 27/00 | (2006.01) |
| G02B 27/01 | (2006.01) |
| G02B 27/28 | (2006.01) |

(52) U.S. Cl.
CPC ....... *G02B 27/283* (2013.01); *G02B 27/0172* (2013.01); *G02B 27/286* (2013.01);
(Continued)

(58) Field of Classification Search
CPC .......................... G02B 27/01; G02B 27/0101; G02B 27/0103; G02B 27/0149; G02B 27/017;
(Continued)

(56) References Cited

U.S. PATENT DOCUMENTS

| 4,924,522 A | 5/1990 | Bray et al. |
| 5,035,500 A | 7/1991 | Rorabaugh et al. |

(Continued)

FOREIGN PATENT DOCUMENTS

| CA | 2815461 A1 | 4/2012 |
| CN | 103261943 A | 8/2013 |

(Continued)

OTHER PUBLICATIONS

International Search Report and Written Opinion, PCT App. No. PCT/US20/25812, dated Jul. 29, 2020, 9 pages.
(Continued)

*Primary Examiner* — James C. Jones
*Assistant Examiner* — Henry Duong
(74) *Attorney, Agent, or Firm* — Nicholson De Vos Webster & Elliott LLP; Judith Szepesi

(57) ABSTRACT

A system including a steerable mirror, a waveguide, first optics, intermediate optics, and final optics. The system includes a first light path for a foveal image element, the first light path including the first optics, the steerable mirror to steer a position of the foveal image element to a particular orientation, intermediate optics, and the final optics to direct the foveal image element to an in-coupling region of the waveguide. The system further includes a second light path for a field image element, the second light path including final optics.

20 Claims, 13 Drawing Sheets

Related U.S. Application Data

(60) Provisional application No. 62/826,888, filed on Mar. 29, 2019.

(52) U.S. Cl.
CPC .............. *G02B 2027/0123* (2013.01); *G02B 2027/0178* (2013.01)

(58) Field of Classification Search
CPC ............ G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0129; G02B 2027/0127; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0183; G02B 2027/0181; G02B 2027/0185; G02B 2027/0187; G02B 2027/019; G02B 2027/0192; G02B 2027/0194; G02B 2027/0196; G02B 2027/0198; G06F 1/206; G06F 15/7871; G06F 1/324; G06F 11/30; Y02D 10/00
USPC ......................................................... 359/630
See application file for complete search history.

(56) References Cited

U.S. PATENT DOCUMENTS

| | | | |
|---|---|---|---|
| 6,008,781 A | 12/1999 | Furness et al. |
| 6,097,353 A | 8/2000 | Melville et al. |
| 6,275,326 B1 | 8/2001 | Bhalla et al. |
| 6,353,503 B1 | 3/2002 | Spitzer et al. |
| 6,356,392 B1 | 3/2002 | Spitzer |
| 6,411,751 B1 | 6/2002 | Giles et al. |
| 7,009,752 B1 | 3/2006 | Lorell et al. |
| 7,786,648 B2 | 8/2010 | Xu et al. |
| 8,203,702 B1 | 6/2012 | Kane et al. |
| 9,128,281 B2 | 9/2015 | Osterhout et al. |
| 9,335,548 B1 | 5/2016 | Cakmakci et al. |
| 9,588,408 B1 | 3/2017 | Linnell |
| 9,710,887 B1 | 7/2017 | Sahlsten et al. |
| 9,711,072 B1 | 7/2017 | Konttori et al. |
| 9,711,114 B1 | 7/2017 | Konttori et al. |
| 9,779,478 B1 | 10/2017 | Wilson et al. |
| 9,972,071 B2 | 5/2018 | Wilson et al. |
| 10,140,695 B2* | 11/2018 | Wilson ................ G06T 5/50 |
| 10,255,714 B2 | 4/2019 | Mitchell et al. |
| 10,284,118 B2 | 5/2019 | Henderson et al. |
| 10,504,207 B1 | 12/2019 | Wilson et al. |
| 10,514,546 B2 | 12/2019 | Eash et al. |
| 11,209,650 B1 | 12/2021 | Trail |
| 2002/0005976 A1 | 1/2002 | Behin et al. |
| 2008/0015553 A1 | 1/2008 | Zacharias |
| 2009/0122385 A1 | 5/2009 | Hilton |
| 2009/0160872 A1 | 6/2009 | Gibbons |
| 2009/0189830 A1 | 7/2009 | Deering et al. |
| 2010/0097580 A1 | 4/2010 | Yamamoto et al. |
| 2010/0149073 A1 | 6/2010 | Chaum et al. |
| 2010/0231706 A1 | 9/2010 | Maguire, Jr. |
| 2011/0075257 A1 | 3/2011 | Hua et al. |
| 2011/0141225 A1 | 6/2011 | Stec et al. |
| 2011/0285967 A1 | 11/2011 | Gollier |
| 2012/0120498 A1 | 5/2012 | Harrison et al. |
| 2012/0154277 A1 | 6/2012 | Bar-Zeev et al. |
| 2012/0176483 A1 | 7/2012 | Border et al. |
| 2013/0100176 A1 | 4/2013 | Lewis et al. |
| 2013/0114146 A1 | 5/2013 | Larson |
| 2013/0208003 A1 | 8/2013 | Bohn et al. |
| 2013/0208330 A1 | 8/2013 | Naono |
| 2013/0286053 A1 | 10/2013 | Fleck et al. |
| 2014/0049643 A1 | 2/2014 | Segerstrom et al. |
| 2014/0300859 A1 | 10/2014 | Oz |
| 2015/0173846 A1 | 6/2015 | Schneider et al. |
| 2015/0201171 A1 | 7/2015 | Takehana |
| 2015/0247723 A1 | 9/2015 | Abovitz et al. |
| 2015/0287165 A1 | 10/2015 | Berghoff |
| 2016/0026253 A1 | 1/2016 | Bradski et al. |
| 2016/0033771 A1 | 2/2016 | Tremblay et al. |
| 2016/0065921 A1 | 3/2016 | Sieler et al. |
| 2016/0077338 A1 | 3/2016 | Robbins et al. |
| 2016/0131912 A1 | 5/2016 | Border et al. |
| 2016/0209648 A1 | 7/2016 | Haddick et al. |
| 2016/0225192 A1 | 8/2016 | Jones et al. |
| 2016/0233793 A1 | 8/2016 | Henderson et al. |
| 2016/0240013 A1 | 8/2016 | Spitzer |
| 2016/0260258 A1 | 9/2016 | Lo et al. |
| 2016/0262608 A1 | 9/2016 | Krueger |
| 2016/0267716 A1 | 9/2016 | Patel |
| 2016/0274365 A1 | 9/2016 | Bailey et al. |
| 2016/0327789 A1 | 11/2016 | Klug et al. |
| 2016/0363841 A1 | 12/2016 | Hino et al. |
| 2016/0379606 A1 | 12/2016 | Kollin et al. |
| 2017/0083084 A1 | 3/2017 | Tatsuta et al. |
| 2017/0124760 A1 | 5/2017 | Murakawa et al. |
| 2017/0188021 A1 | 6/2017 | Lo et al. |
| 2017/0245753 A1 | 8/2017 | Donaldson |
| 2017/0255012 A1 | 9/2017 | Tam et al. |
| 2017/0255020 A1 | 9/2017 | Tam et al. |
| 2017/0255766 A1 | 9/2017 | Kaehler |
| 2017/0263046 A1 | 9/2017 | Patney et al. |
| 2017/0287446 A1 | 10/2017 | Young et al. |
| 2017/0287447 A1 | 10/2017 | Barry et al. |
| 2017/0316601 A1 | 11/2017 | Kakarlapudi et al. |
| 2017/0318235 A1 | 11/2017 | Schneider et al. |
| 2018/0003962 A1 | 1/2018 | Urey et al. |
| 2018/0031849 A1 | 2/2018 | Omanovic et al. |
| 2018/0096471 A1 | 4/2018 | Wilson et al. |
| 2018/0136471 A1 | 5/2018 | Miller et al. |
| 2018/0136473 A1 | 5/2018 | Cobb et al. |
| 2018/0174451 A1 | 6/2018 | Rao |
| 2018/0183356 A1 | 6/2018 | Henderson et al. |
| 2018/0227630 A1 | 8/2018 | Sengelaub et al. |
| 2018/0267294 A1 | 9/2018 | Aschwanden et al. |
| 2018/0269266 A1 | 9/2018 | Ahmed et al. |
| 2018/0275410 A1 | 9/2018 | Yeoh et al. |
| 2018/0284451 A1 | 10/2018 | Eash et al. |
| 2018/0293041 A1 | 10/2018 | Harviainen |
| 2018/0321484 A1 | 11/2018 | Bailey et al. |
| 2018/0344413 A1 | 12/2018 | Rappel et al. |
| 2019/0041524 A1 | 2/2019 | Korsgaard et al. |
| 2019/0049721 A1 | 2/2019 | Anton et al. |
| 2019/0179149 A1 | 6/2019 | Curtis et al. |
| 2020/0018965 A1 | 1/2020 | Milner-Moore et al. |
| 2020/0133006 A1 | 4/2020 | Eash et al. |
| 2020/0271932 A1 | 8/2020 | Tuomisto et al. |
| 2021/0293931 A1 | 9/2021 | Nemet et al. |

FOREIGN PATENT DOCUMENTS

| | | |
|---|---|---|
| CN | 107392989 A | 11/2017 |
| CN | 107852521 A | 3/2018 |
| CN | 108474949 A | 8/2018 |
| EP | 1970887 A1 | 9/2008 |
| GB | 2510001 A | 7/2014 |
| JP | 08-313843 A | 11/1996 |

(56) References Cited

FOREIGN PATENT DOCUMENTS

| | | |
|---|---|---|
| JP | 2001-281594 | 10/2001 |
| JP | 2007-171228 A | 7/2007 |
| JP | 2009-182754 A | 8/2009 |
| JP | 2014-511512 A | 5/2014 |
| JP | 2015-503934 A | 2/2015 |
| JP | 2017-028510 A | 2/2017 |
| JP | 2017-534075 A | 11/2017 |
| KR | 10-2017-0055992 A | 5/2017 |
| KR | 10-2018-0104056 A | 9/2018 |
| WO | 2009/131626 A2 | 10/2009 |
| WO | 2012/082807 A2 | 6/2012 |
| WO | 2013/035086 A1 | 3/2013 |
| WO | 2017/113117 A1 | 7/2017 |
| WO | 2018/019831 A1 | 2/2018 |
| WO | 2018/165484 A1 | 9/2018 |
| WO | 2018/175625 A1 | 9/2018 |
| WO | 2018/183405 A1 | 10/2018 |
| WO | 2019/104046 A1 | 5/2019 |

OTHER PUBLICATIONS

Milanovic et al., "Sub-100 us Settling Time and Low Voltage Operation for Gimbal-less Two-Axis Scanners," IEEE/LEOS Optical MEMS 2004, Takamatsu, Japan, Aug. 2004. (Year: 2004).

Non Final Office Action, U.S. Appl. No. 16/835,032, dated Jun. 6, 2022, 13 pages.

Notice of Allowance, U.S. Appl. No. 16/835,032, dated Oct. 13, 2022, 11 pages.

Request for the Submission of an Opinion, KR App. No. 10-2021-7032204, dated Jun. 1, 2023, 22 pages (9 pages of English Translation and 13 pages of Original Document).

* cited by examiner

STEERABLE HYBRID DISPLAY USING A WAVEGUIDE

RELATED APPLICATION

The present application claims priority as a continuation of U.S. patent application Ser. No. 16/835,032, filed Mar. 30, 2020, issuing as U.S. Pat. No. 11,586,049 on Feb. 21, 2023, which application claims priority to U.S. Provisional Application No. 62/826,888, filed on Mar. 29, 2019, and incorporates that application in its entirety.

FIELD

The present invention relates to displays and more particularly to steerable displays.

BACKGROUND

Near-eye displays have the competing requirements of displaying images at a high resolution, over a large field of view (FOV). For many applications in virtual and augmented reality, the field of view should be greater than 90 degrees, and ideally the binocular field of view would extend past 180 degrees. At the same time, the resolution of the display should match that of the human visual system so that little or no pixelation is perceived in the virtual images. Combining these two requirements in a single system presents a number of challenges.

Additionally, optical systems that can project wide FOV images to the user with sufficiently high resolution over the entire field of view are also difficult to design. Systems architectures that are able to present the user with high resolution images over a wide field of view, while simultaneously reducing the rendering, data rate, and panel requirements will enable new applications for augmented and virtual reality systems.

Furthermore, for many applications in augmented reality, the form factor of devices may be desired to resemble regular eye-glasses. This presents additional optical design challenges.

LIST OF FIGURES

The present invention is illustrated by way of example, and not by way of limitation, in the figures of the accompanying drawings and in which like reference numerals refer to similar elements and in which.

DETAILED DESCRIPTION

Figure 1A:
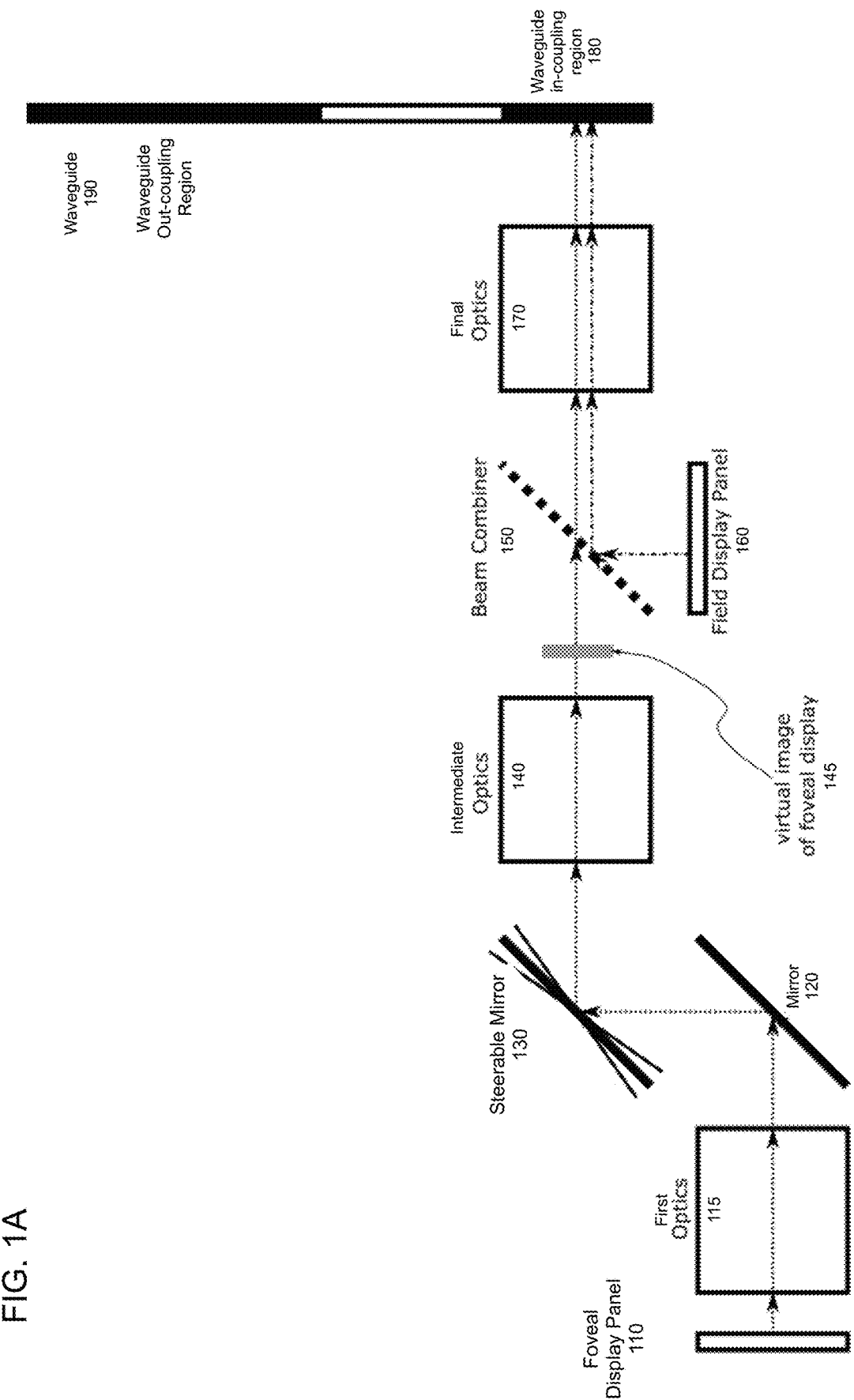
FIG. 1A illustrates one embodiment of a hybrid display showing a combined steerable foveal display and field display input into a waveguide.

The present application discloses a hybrid display in which a steerable display, also referred to as a foveal display, and a field display are both input into a waveguide to be directed to the user's eye. The foveal display in one embodiment is a steerable display which is moveably positioned to provide a high resolution image where the user's fovea is currently located. The "fovea" is a small depression in the retina of the eye where visual acuity is highest.

In one embodiment, the system takes advantage of this by providing a steerable foveal display directed to align with the center of the field of view of the user's eye, or another calculated position. In one embodiment, a field display provides a lower resolution field display image over a larger field of view. This means that the user perceives the image in their peripheral vision, as well as in the direction of their gaze.

In one embodiment, the system provides a higher resolution image using a foveal display, directed primarily toward the center of the field of view of the user's eye, and a lower resolution field display image over a large field of view utilizing a field display, One embodiment of implementing such a field display and foveal display combination is described in U.S. Pat. No. 10,514,546, which is incorporated herein by reference. One embodiment of implementing such a field display and foveal display is described below, with respect to FIGS. 9 and 10.

In one embodiment, the system uses a high pixel density image per eye to present a high resolution image over a small field of view and a lower-resolution image over a large field to fill in the binocular and peripheral regions. Although an "image" is discussed, one of skill in the art would understand that the techniques and description applies to a display of a continuous stream of images, such as video.

In one embodiment, the image from a steerable foveal display is input into a waveguide to be directed to the user's eye. In one embodiment, the image from a secondary field display is also input into a waveguide. In one embodiment, the two displays may be output through a single waveguide. In another embodiment, the two displays may have separate associated waveguides.

The present application describes a system in which a steerable display, which can output an image at a variety of positions, is steered into a waveguide for output to the user's eye. The ability to steer a positionable image, from a steerable element into the waveguide, is a novel feature of the present application. The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1 illustrates one embodiment of a steerable foveal display combined with a secondary field display and input into a waveguide. The foveal display panel 110 in one embodiment is DLP, LCOS, LBS, microLED, microOLED, LCD, or another technology, Although a single line is used to illustrate the light beams in FIG. 1 and other figures, one of skill in the art would understand that the display panel projects an entire image, rather than a single light beam.

The foveal image, from foveal display panel 110, is passed through first optics 115, and then to a steerable mirror 130. The optics 115 in one embodiment comprise one or more lenses. In one embodiment, one or more mirrors 120 may be used to shift the light, but are optional.

The steerable element 130 is used to steer the image to the selected location in the user's field of view. In one embodiment, the steerable element 130 is a steerable mirror. Other types of elements used to steer the image to the selected location in the user's field of view may be used. As noted above, the foveal image may be targeted in one embodiment to the user's fovea. In one embodiment, the steerable element 130 has two degrees of freedom and can position the foveal image anywhere within a range. In one embodiment, that range is between +/−1 degree and +/−20 degrees, while the size of the foveal image is between 1 degree and 20 degrees.

The image data reflected from the steerable mirror 130 may be passed through a second set of optics 140. These intermediate optics 140 in one embodiment comprise one or more lenses. In one embodiment, the intermediate optics 140 may be diffractive optics. In one embodiment, the intermediate optics 140 may be refractive optics. In one embodiment, the optics 140 may be polarization dependent. The output of optics 140 form a virtual image 145 of the foveal display after the intermediate optics 140. The virtual image 145 in one embodiment is a demagnified version of the image from the foveal display panel 110.

Beam splitter/combiner 150 passes the foveal image light through, while reflecting the image data from the field display panel 160. The beam splitter/combiner 150 is an element which splits beams in one direction, and combines beams in the other direction. The beam splitter/combiner 150 acts as a beam splitter when it receives one beam, and reflects a portion of it in one direction while passing another portion in a different direction. The beam splitter/combiner acts as a beam combiner when it combines beams entering it from two directions, by reflecting one beam while passing the other beam. The beam splitter/combiner 150 in this case works as a beam combiner, which combines the foveal image and field image data. The field display panel 160 may use any display technology, such as DLP, LCOS, LBS, microLED, microOLED, LCD, etc.

The beam splitter/combiner 150 in one embodiment is a partial mirror. The beam splitter/combiner 150 in another embodiment is a polarized beam splitter. While the image shown shows the field display being reflected and the foveal image being passed, the reverse may also be implemented. In one embodiment, the passing versus reflection depends on the polarization of the image data. In one embodiment, the foveal image has a first polarization, and the field image has the opposite polarization. The beam splitter/combiner 150 combines the field image and foveal image, and passes them to final optics 170.

The combined image is then passed through final optics 170 and then to the in-coupling region 180 of the waveguide 190. The waveguide 190 leads the combined foveal image and field image to the user's eye.

The optical elements included in this embodiment, and all other embodiments, including the first optics, intermediate optics, and final optics, are technology agnostic, and could include diffractive, refractive, reflective, or elements with any other type of optical configuration. The optical elements may also be polarization dependent.

Figure 1B:
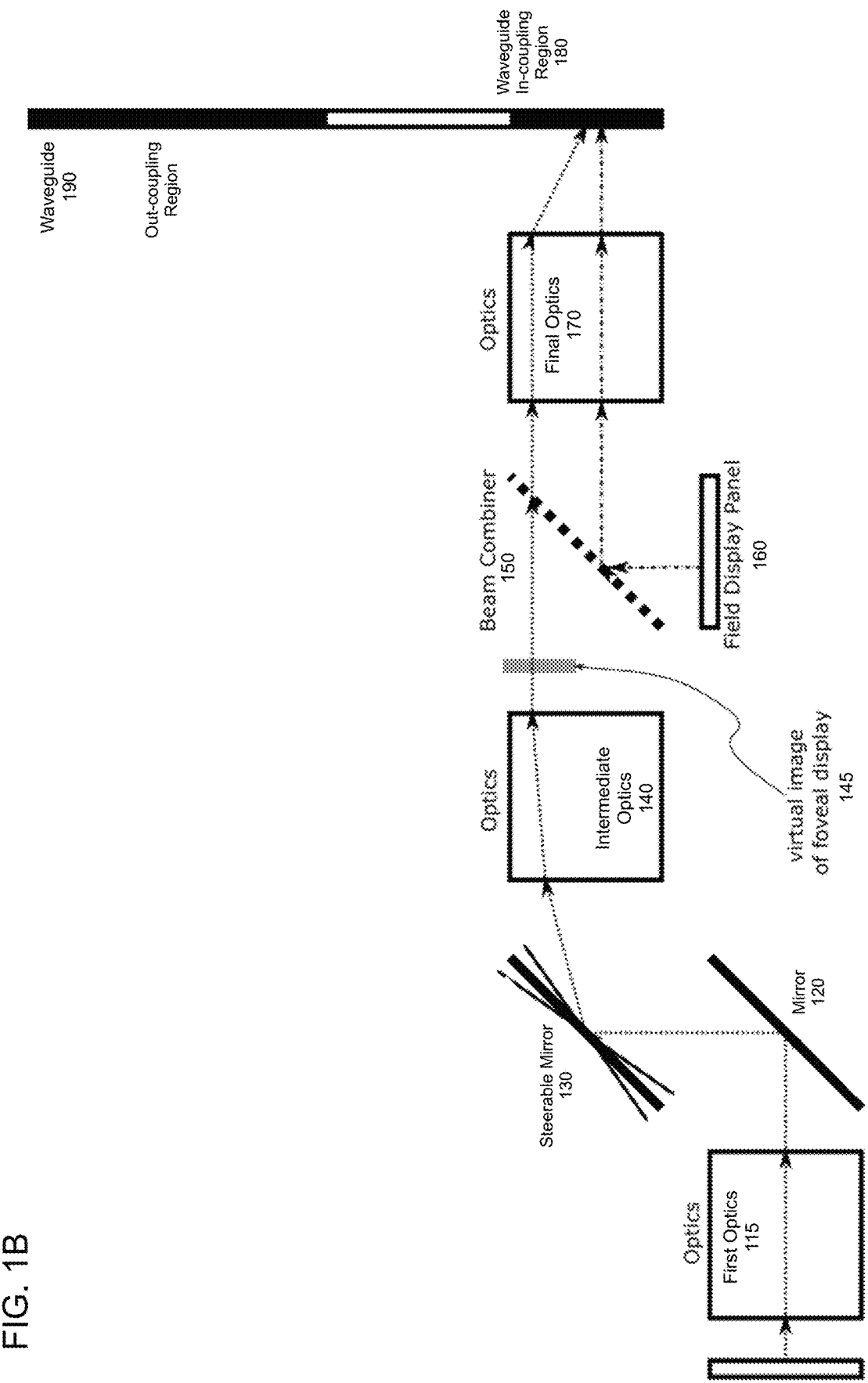
FIG. 1B illustrates one embodiment of the display of FIG. 1A, with the foveal display steered to a different position.

FIG. 1B illustrates the same configuration as FIG. 1A, with the steerable mirror 130 moved so that the foveal image data is directed into the intermediate optics 140 at a different angle. This means that the virtual image 145 of the foveal image is formed at a different position. The image then goes through beam splitter/combiner 150. Final optics 170 ensures that the foveal image enters the waveguide at approximately the same position regardless of the positioning of the steerable mirror 130. However, the angle of the foveal image entering the grating 180 differs depending on the position of the steerable mirror 130.

The light exiting the waveguide 190 will exit at the same angle, or the opposite angle as it entered the waveguide 190. Thus, the angle at which the foveal image enters the waveguide defines the position of the foveal image. In some applications, it may be desirable to use a single display per eye for both the foveal and field displays. One embodiment may spatially split one display into two or more regions for the foveal or field displays.

Figure 2:
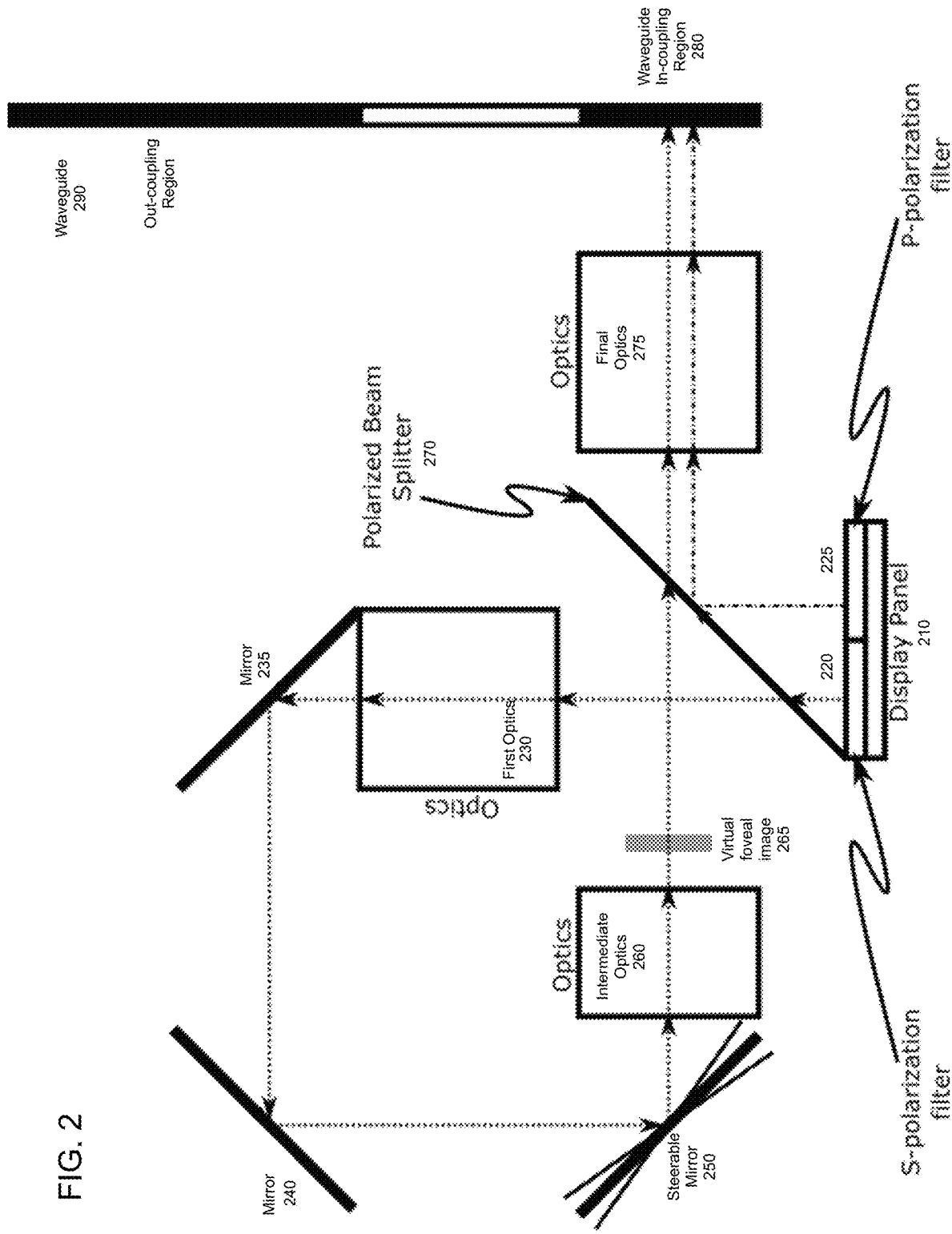
FIG. 2 illustrates one embodiment of using a hybrid display with a single display spatially split into a steerable foveal path and a field path.

FIG. 2 illustrates one embodiment of a steerable foveal display and field display input into a waveguide, only using a single display panel 210 spatially split into two regions. One of the regions follows a steerable foveal path, the other follows a field path. Both paths are combined and input into a waveguide.

In one embodiment, the display panel 210 is split into two areas, using polarization filters 220, 225. Display panel 210 may use technologies such as DLP, LCOS, LBS, microLED, microOLED, LCD, etc. In one embodiment, the two areas of the display panel 210 have the same pixel density. However, the portion of the image that is used for the foveal age is demagnified by the first and intermediate optics, so that the pixel density is increased for the foveal image. In one embodiment, the image is reduced to between 10% and 40% of its original size.

In one embodiment, the S-polarized portion of the image data is the foveal image, and passes through beam splitter/combiner 270. In one embodiment, the beam splitter/combiner 270 is a beam splitter in this case. In one embodiment, the beam splitter/combiner 270 is a polarized beam splitter 270. The P-polarized portion of the image data is the field image, and is reflected through final optics 275 to the waveguide's input coupler 280. Of course, the split may be the other way, with the P-polarized portion being the foveal image, while the S-polarized portion is the field image.

The foveal image portion, in one embodiment, the S-polarized portion of the image data, is passed through first optics 230. In one embodiment, the image data is then directed by one or more mirrors 235, 240 to a steerable mirror. In one embodiment, the steerable mirror 250 positions the foveal image data appropriately, for the location to which the image should be passed. The steerable mirror 250 directs the image to intermediate optics 260. The virtual foveal image 265 moves horizontally and vertically, to position the image appropriately to the user's fovea or other designated position.

The virtual foveal image 265 is formed by intermediate optics 260. The virtual foveal image 265 is a demagnified version of the image from the foveal portion of the display 210. The foveal image then passes through the polarized beam splitter/combiner 270. The field display image, from display panel 210, also passes through the polarized beam splitter/combiner 270.

Both the foveal image and the field image pass through final optics 275, before entering the waveguide 290 through the waveguide in-coupling region 280. This format utilizes a single display panel 210, which can be advantageous. Although there is not a separate illustration, as the steerable mirror 250 moves the foveal image, the image passes through the final optics 275 to be steered into the waveguide in-coupling region 280.

Another embodiment of using a single display per eye for both the foveal and field displays utilizes time sequential splitting of the foveal and field image data, with polarization to provide the time sequential split. In that configuration, the polarization filter may be switched on a time sequential basis.

Figure 3A:
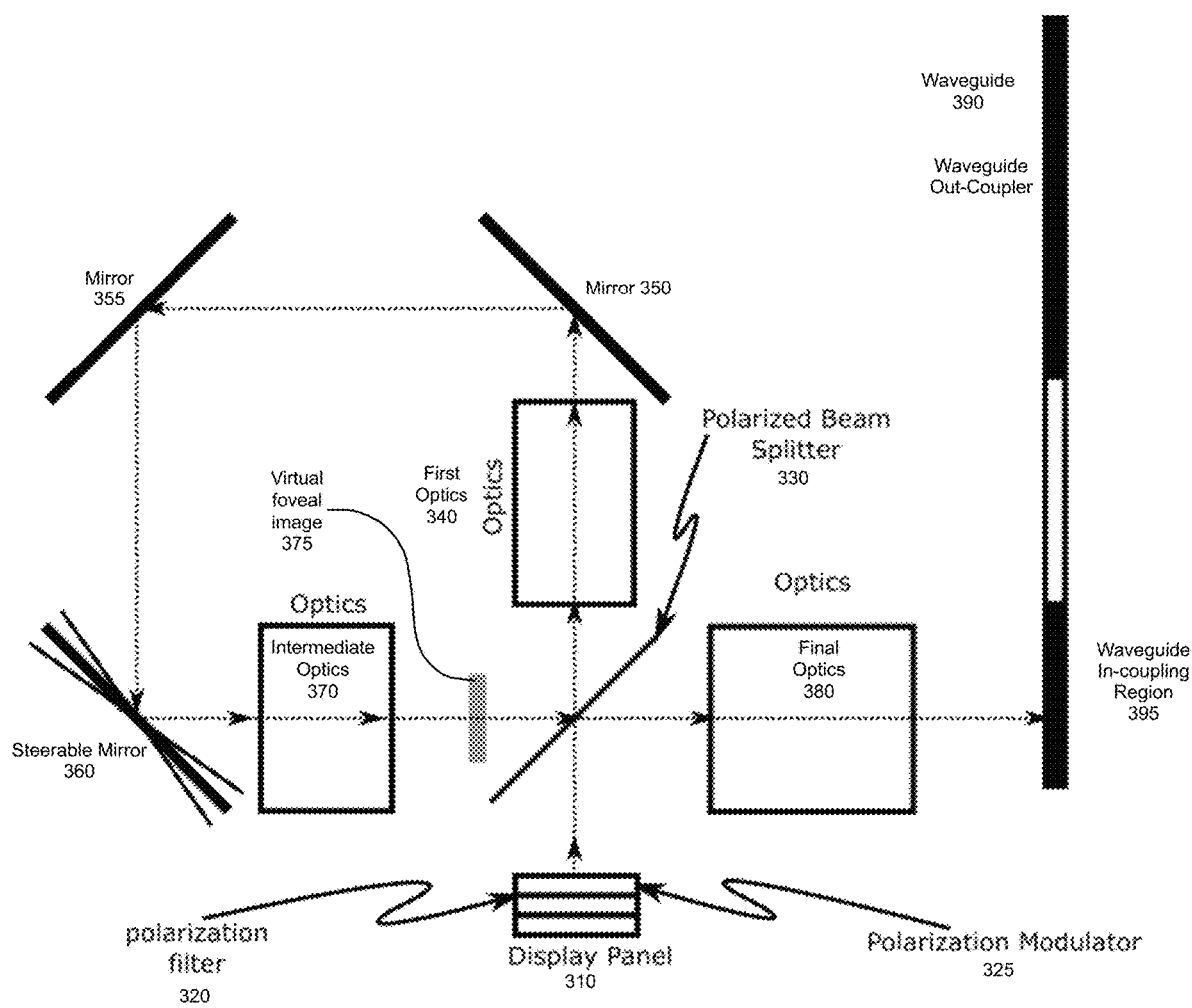
FIG. 3A illustrates one embodiment of a hybrid display with a single display illustrating a steerable foveal path, selected through polarization.
Figure 3B:
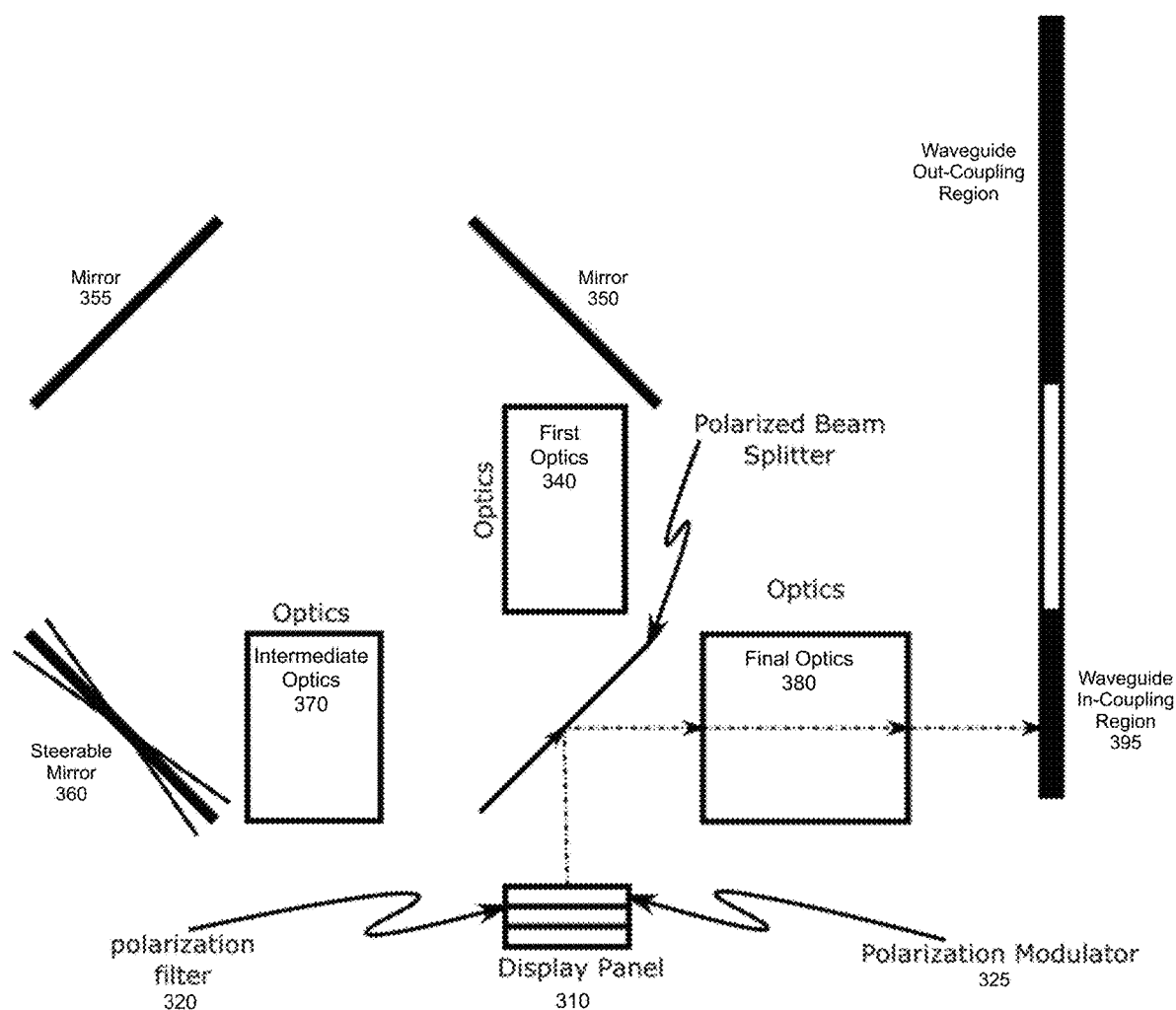
FIG. 3B illustrates one embodiment of the hybrid display of FIG. 3A, illustrating a field path selected through polarization.

FIG. 3A illustrates one embodiment of another hybrid display with a shared display panel, in which the single display panel 310 is used for both the foveal image and the field image. FIG. 3A illustrates the display, showing the light path for the foveal display, while FIG. 3B illustrates the display showing the light path for the field display.

One embodiment of using a single display per eye for both foveal and field displays utilizes polarization and time multiplexing. By rapidly alternating polarization states, a user perceives a combined foveal and field image.

The display panel 310 may be a DLP, LCOS, LBS, microLED, microOLED, LCD, or other type of panel. A polarization filter 320 and polarization modulator 325 are positioned above the display panel 310, in one embodiment.

In this illustration of FIG. 3A, the light beam shown is the foveal display beam, polarized to pass through beam splitter/combiner 330 in the first direction. In one embodiment, the beam splitter/combiner is a polarized beam splitter 330. Thus the foveal image passes through beam splitter 330, and through first optics 340. One or more mirrors 350, 355 may redirect the polarized light for the foveal display to steerable mirror 360. The output of steerable mirror 360, now directed toward the user's fovea or another determined location, is passed through intermediate optics 370.

The output of intermediate optics 370 form a virtual foveal image 375. The now oriented foveal image passes through beam splitter/combiner 330 a second time. This time, the beam splitter/combiner 330 acts as a beam combiner. The combined beams pass through final optics 380, and then to the waveguide's in-coupling region 395. As discussed above, regardless of the angle of the steerable mirror 360, the final optics 380 ensure that the foveal image data is correctly steered into the in-coupling region 395 of waveguide 390.

In contrast, as shown in FIG. 3B, the opposite polarized light for the field display is reflected by the polarized beam splitter/combiner 330 through final optics 380, to the waveguide in-coupling region 395.

In one embodiment, in use the system alternates foveal image data and field image data. In one embodiment, the alternating may not be one-to-one. For example, if the foveal display is a multi-focal display, multiple images for the multiple focal lengths for the foveal display may be sent before sending one field display image.

In general, the duty cycle of a field display is 10-50%. Thus, the alternating of images will not degrade the user experience, or the quality of the perceived image.

Figure 4:
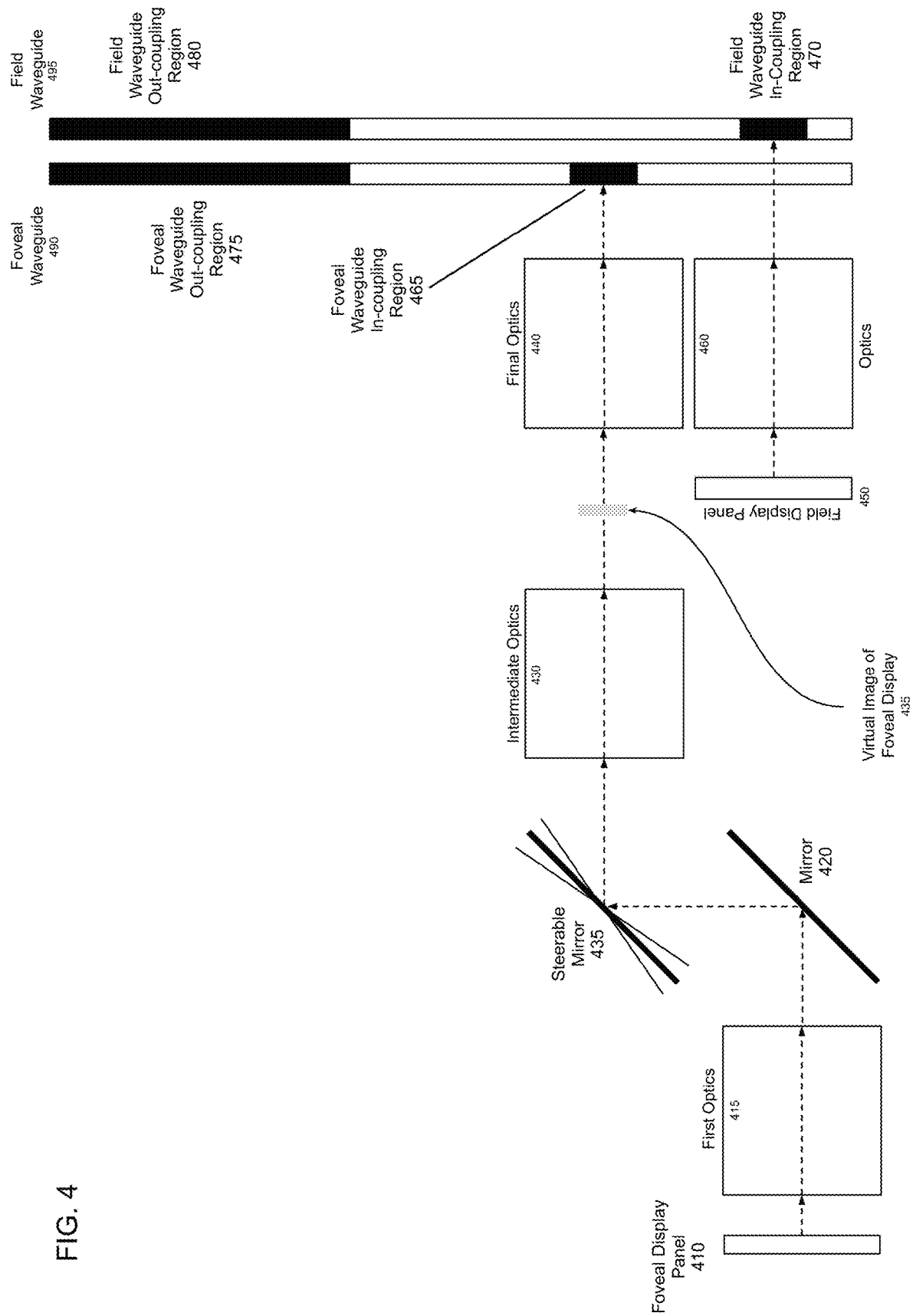
FIG. 4 illustrates one embodiment of a dual waveguide configuration.

FIG. 4 illustrates one embodiment of a dual waveguide configuration. The dual waveguide configuration has a foveal waveguide 490 and a separate field waveguide 495. The foveal display panel 410 passes in one embodiment through first optics 415. One or more mirrors 420 may direct the image toward a steerable mirror 425. The steerable mirror 425, or other steerable element, orients the foveal image to the user's fovea or other designated position.

The image is directed by the steerable mirror 425 to intermediate optics 430. The intermediate optics 430 form a virtual image of the foveal display 435.

The image data is then directed through final optics 440. The final optics steer the image into the in-coupling region 465 of the foveal waveguide 490.

The field display image is generated by the field display panel 450. The field image is directed through a separate final optics 460, to the field waveguide 495. The output of the field waveguide 495 and the foveal waveguide 490 is directed to the user's eye. The combined image is perceived by the user as a single combined image.

Figure 5:
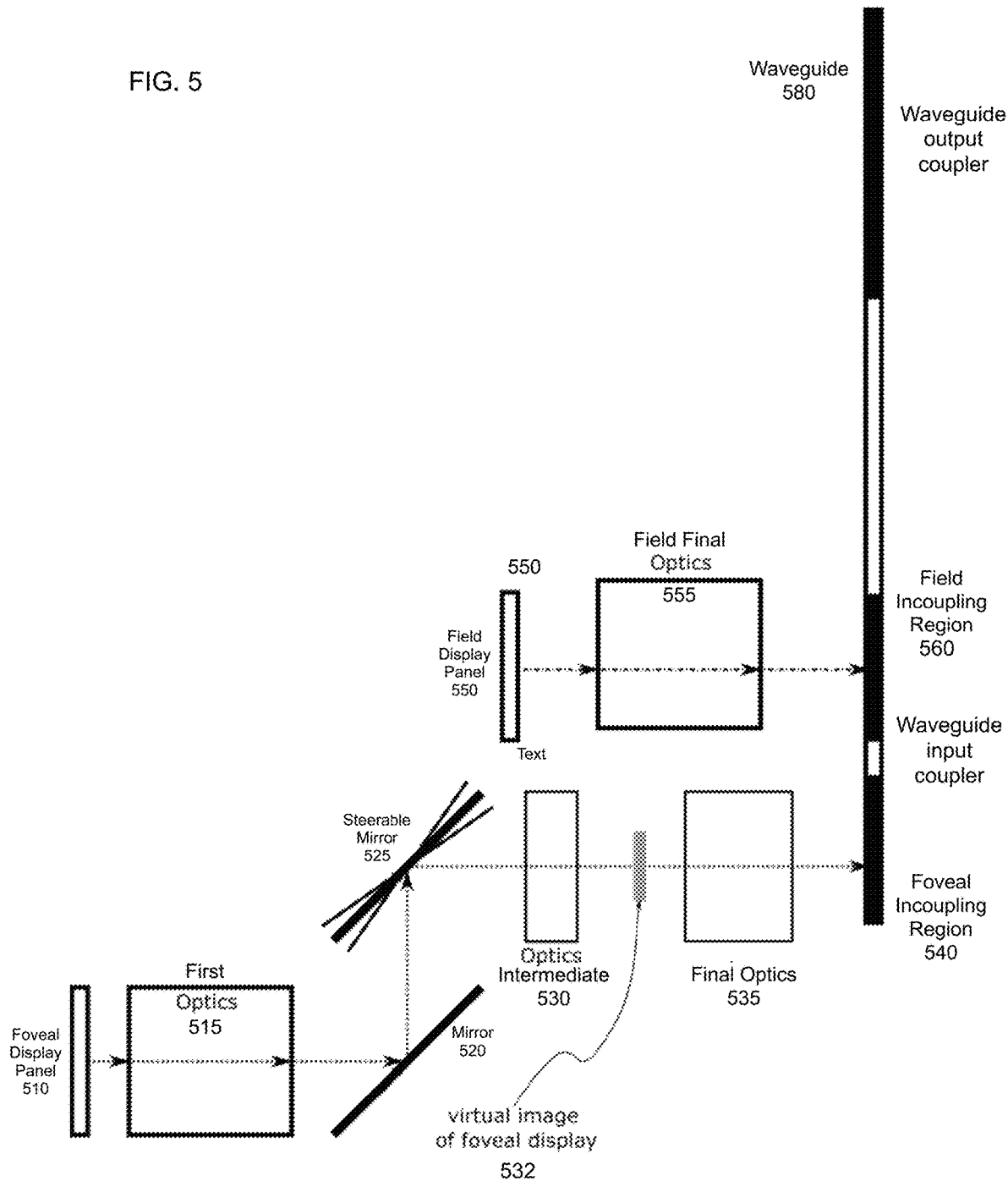
FIG. 5 illustrates one embodiment of having separated in-coupling regions in a single waveguide.

FIG. 5 illustrates one embodiment of having separated in-coupling regions for a single waveguide. The separated in-coupling regions in-couple the foveal image and the field image into the same waveguide 580. The separated in-coupling regions may include a single long input coupler with two in-coupling regions, or may include two input couplers separated by a space.

The image from the foveal display panel 510 is passed through first optics 515. A mirror 520 redirects the output of the first optics to the steerable mirror 525. The steerable mirror 525 positions the image for the user's fovea, or another selected position. The image is then passed through intermediate optics 530. The virtual image 532 is formed by intermediate optics 530. Final optics 535 direct the image into the foveal in-coupling region 540 of waveguide 580.

The field display takes a separate path. The output of the field display panel 550 is passed through a separate field display final optics 555. The output of the field display final optics 555 enters the waveguide 580 through the field in-coupling region 560. The foveal image and the field image travel through waveguide 580 and are output through the out-coupling region, to the user's eye.

Figure 6:
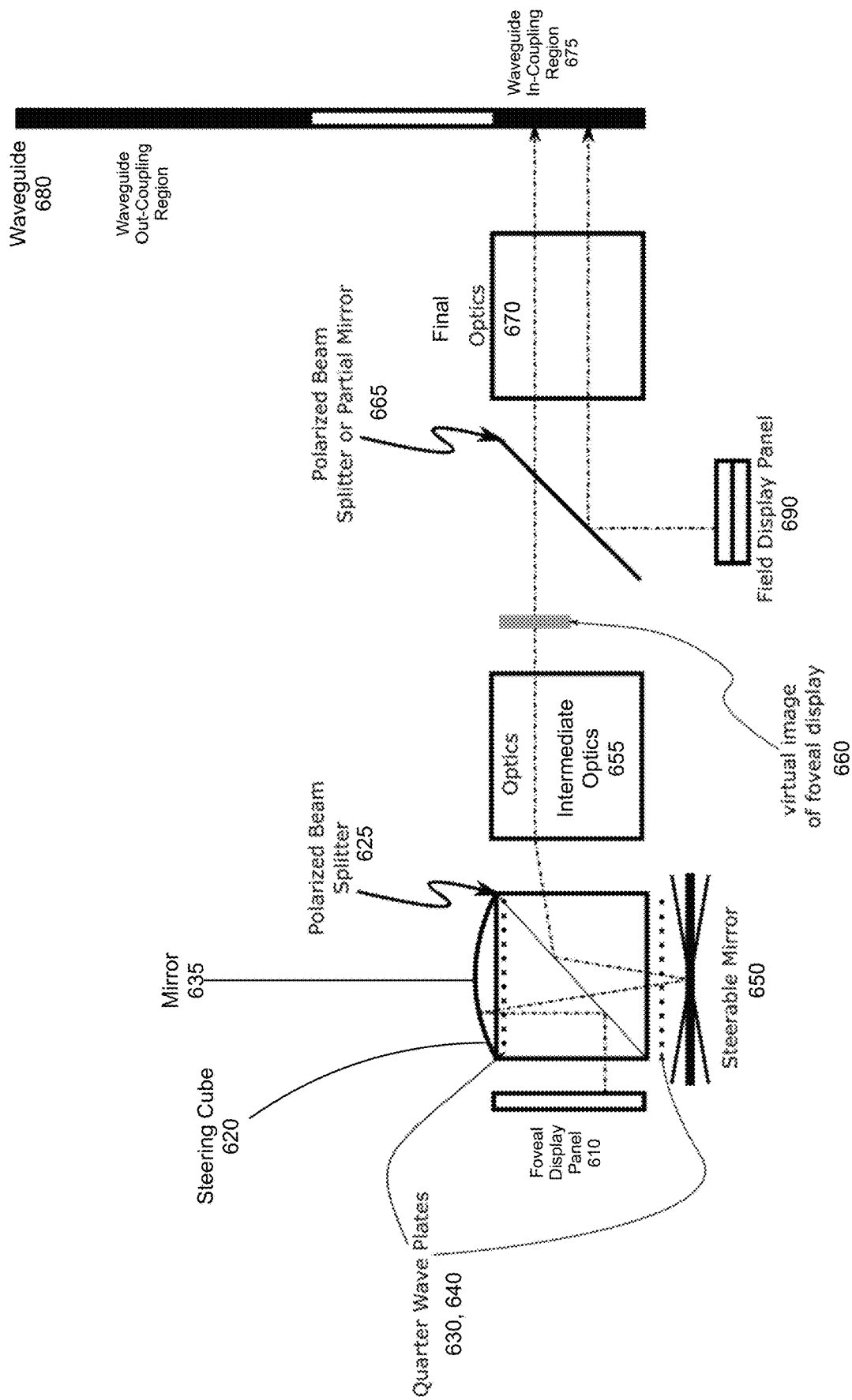
FIG. 6 illustrates one embodiment of a hybrid display using a steering cube, with a waveguide having a single in-coupling region.

FIG. 6 illustrates one embodiment of a hybrid display using a steering cube, with a waveguide having a single in-coupling region. The system includes a foveal display panel 610. The output of the foveal display panel 610 passes through a steering cube 620.

The steering cube 620 in one embodiment is a rectangular prism. The steering cube 620 is made of an optically clear material, such as glass or plastic. In one embodiment, the steering cube 620 is a cube, having dimensions of 0.5 cm to 2 cm. In one embodiment, it is a 1 cm cube. The entry face of the steering cube 620 faces the foveal display panel 610. A polarized beam splitter 625 is a plane, diagonally across the steering cube 620. In one embodiment, the polarized beam splitter bisects the cube forming two congruent triangular prisms. The polarized beam splitter 625 reflects the light entering the steering cube 620 from the foveal display panel 610. The polarized beam splitter reflects the light toward a first side of the steering cube 620. A first quarter wave plate 630 is positioned along the first side. A mirror 635 lies beyond the quarter wave plate 630. The mirror, in one embodiment, is integral with the steering cube 620. In another embodiment, the mirror 635 is separate from the steering cube 620. In one embodiment, the mirror 635 is a curved concave mirror. In another embodiment, the mirror 635 is a flat mirror, or convex mirror.

The mirror 635 reflects the image back, through the steering cube 620, to the second side, opposite the first side. The image passes back through the first quarter wave plate 630. By twice passing through the first quarter wave plate 630, the polarization of the image is flipped by 90 degrees. This means the light passes through the polarized beam splitter 625 on its way to the second side of the steering cube 620.

The light exits through the second face of the steering cube 620. The light passes through a second quarter wave plate 640. The light then impacts the steerable mirror 650. The steerable mirror 650 positions the light, to place the foveal image data in an appropriate location, as discussed above.

The steerable mirror 650 reflects the image, back into the second face of the steering cube 620. By the light passing through the second quarter wave plate 640 twice, the polarization is again flipped. Thus, when the light impacts the polarized beam splitter 625 for the third time, it is reflected, out of the third side of the steering cube 620.

The light then passes through intermediate optics 655. The virtual foveal image 660 is formed by the intermediate optics 655. The light then passes through polarized beam splitter/combiner or partial mirror 665. The foveal image data passes through a polarized beam splitter/combiner or partial mirror 665, to final optics 670. The output of final optics 665 are steered to the in-coupling region 675 of the waveguide 680.

The image from the field display panel 690 is polarized in the opposite direction from the foveal image data exiting the steering cube 620, and is thus reflected by the polarized beam splitter/combiner or partial mirror 665 toward final optics 670. In one embodiment, a polarizer may be used to polarize the image from the field display panel 690. The field display image is passed by the final optics 670 to the in-coupling region 675 of the waveguide 680.

Note that although the image illustrated shows a straight path for the foveal display and a turned path for the field display, this may be altered. Furthermore, in all configurations additional mirrors may be used to reposition the image data.

Figure 7:
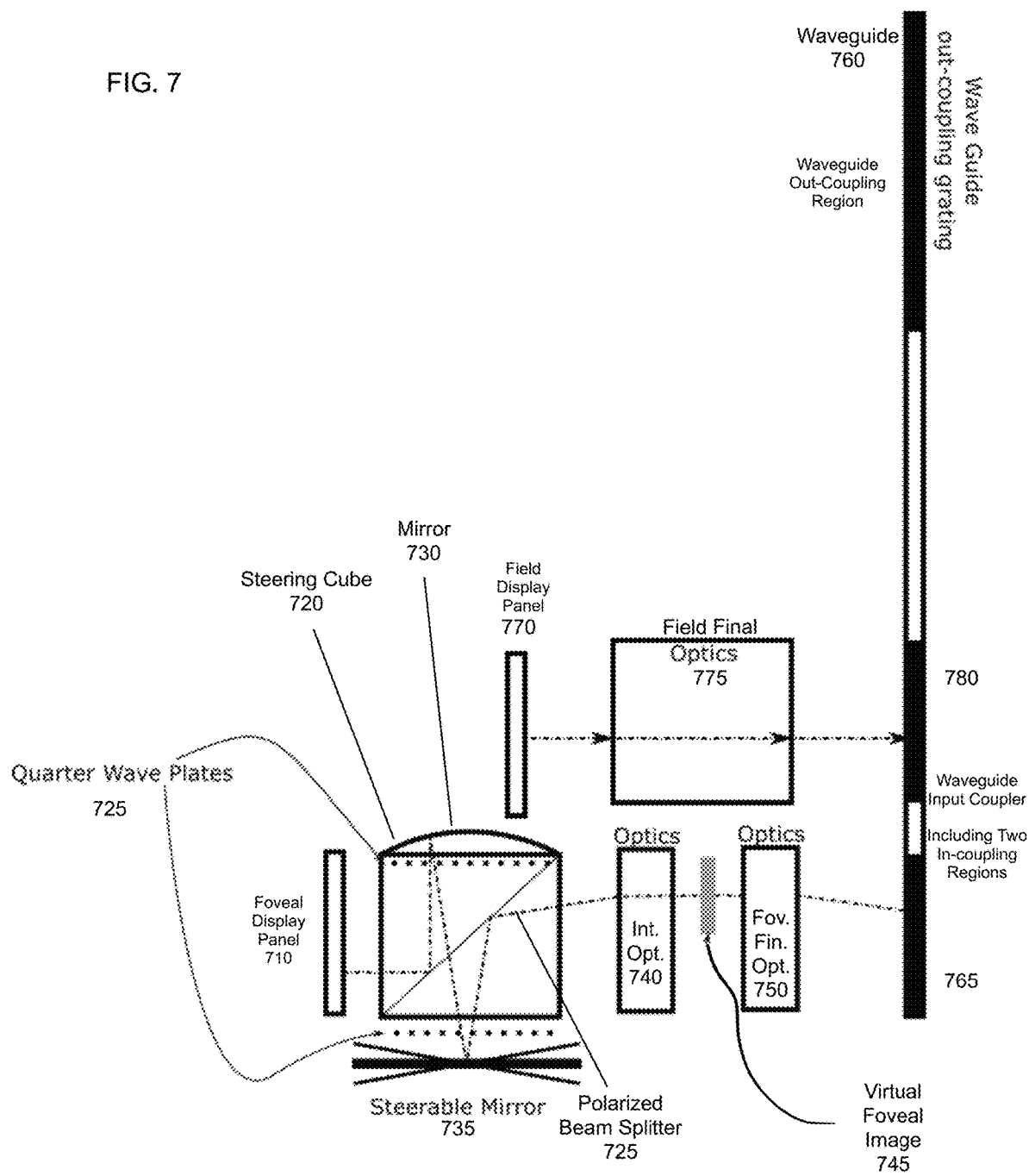
FIG. 7 illustrates another embodiment of a hybrid display using a steering cube, with a waveguide having two in-coupling regions.

FIG. 7 illustrates another embodiment of a hybrid display using a steering cube, with a waveguide having two in-coupling regions. Because this configuration has separate in-coupling regions for the foveal image and the field image, there is no need for a beam splitter/combiner. The separated in-coupling regions may include a single long input coupler with two in-coupling regions, or may include two input couplers separated by a space.

The output of foveal display panel 710 is passed through the steering cube 720. The steering cube's polarized beam splitter 725 reflects to the mirror 730, which in turn reflects it to the steerable mirror 735. Quarter wave plates 725 on the first and second face rotate the polarization of the light. The light then exits the steering cube 720. Intermediate optics 740 form the virtual foveal image 745. The image then passes through the foveal final optics 750, which steers the output into the foveal in-coupling region 765 of the waveguide 760.

The field display panel 770 has an output which passes through a separate field final optics 775. The output of the field final optics 775 is input to the field in-coupling region 780 of the waveguide 760.

In another embodiment, the single waveguide 760 may be replaced by a separate foveal waveguide and field waveguide, as shown in FIG. 4.

Figure 8:
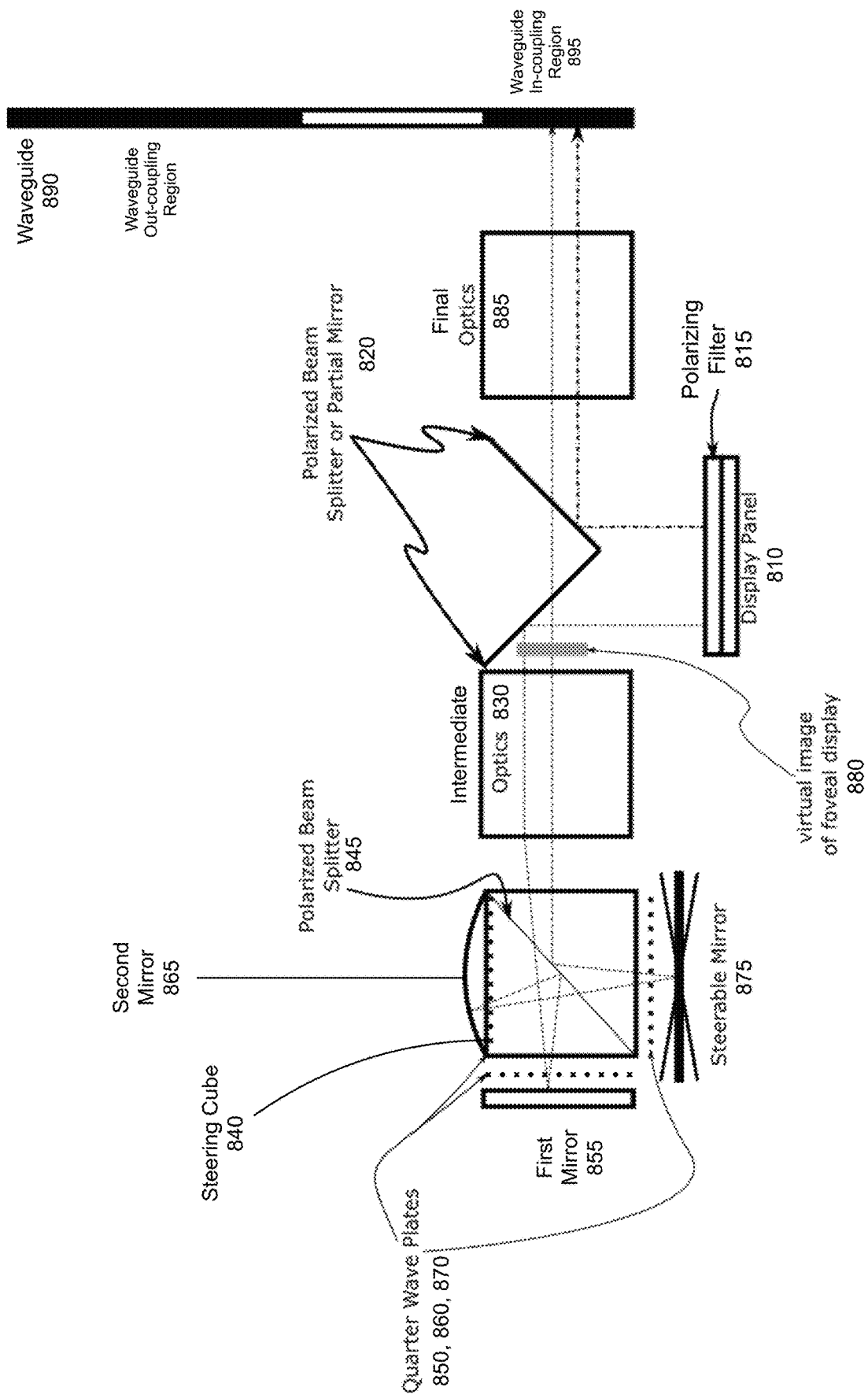
FIG. 8 illustrates another embodiment of a hybrid display using a steering cube, with a single split display.

FIG. 8 illustrates another embodiment of a hybrid display using a steering cube, with a single split display. The display panel 810 has two portions, one for the foveal display and one for the field display. In one embodiment, a polarizing filter 815 is across the display panel. The polarizing filter 815 polarizes the image. A polarized beam splitter/combiner 820 has two portions, to reflect the image from the field display in one direction, and from the foveal display to the other direction.

The foveal image is directed by the polarized beam splitter/combiner 820 toward intermediate optics 830. The image passes through intermediate optics 830, to a steering cube 840. In one embodiment, the entry face of the steering cube faces the intermediate optics. The light travels through the steering cube 840, and passes through the polarized beam splitter 845. The light then exits the steering cube 840, through first quarter wave plate 850, toward a first mirror 855. In one embodiment, the first mirror is a flat mirror. In another embodiment, the first mirror 855 may be a curved mirror. The image is then reflected by mirror 855, and when it again impacts the polarized beam splitter 845, it is reflected toward a second face of the steering cube 840, since its polarization was rotated by passing through the first quarter wave plate 850.

The second face of the steering cube 840 also includes a second quarter wave plate 860, and a second mirror 865. The second mirror 865 may be curved or straight. The second mirror 865 reflects the light back to the steering cube 840, toward the third face of the steering cube. The light passes through the polarized beam splitter 845, since its polarization has again been rotated by the double pass through the second quarter wave plate 860. At the third face of the steering cube there is a third wave plate 870. When the light passes out of the steering cube 840, through the third quarter wave plate 870, it impacts steering mirror 875. The steering mirror 875 positions the light for the user's fovea or other designed position, and reflects the light back into the steering cube 840, through the third quarter wave plate 870.

The light which impacts the polarized beam splitter 845, which reflects the light out of the steering cube 840, toward intermediate optics 830. The output of the intermediate optics 830 creates the virtual foveal image 880.

The light then passes through the polarized beam splitter/combiner 820 which initially directed the light toward the steering cube 840, which now acts as a beam combiner, combining the foveal image from intermediate optics 830 with the field image from display panel 810. The light then goes through the final optics 885. The output of final optics 885 are directed to the waveguide in-coupling region 895, of the waveguide 890. The field display image is reflected by the other portion of the polarized beam splitter/combiner or partial mirror 820, toward final optics 885. The output of final optics are directed to the waveguide in-coupling region 895, of the waveguide 890.

Figure 9:
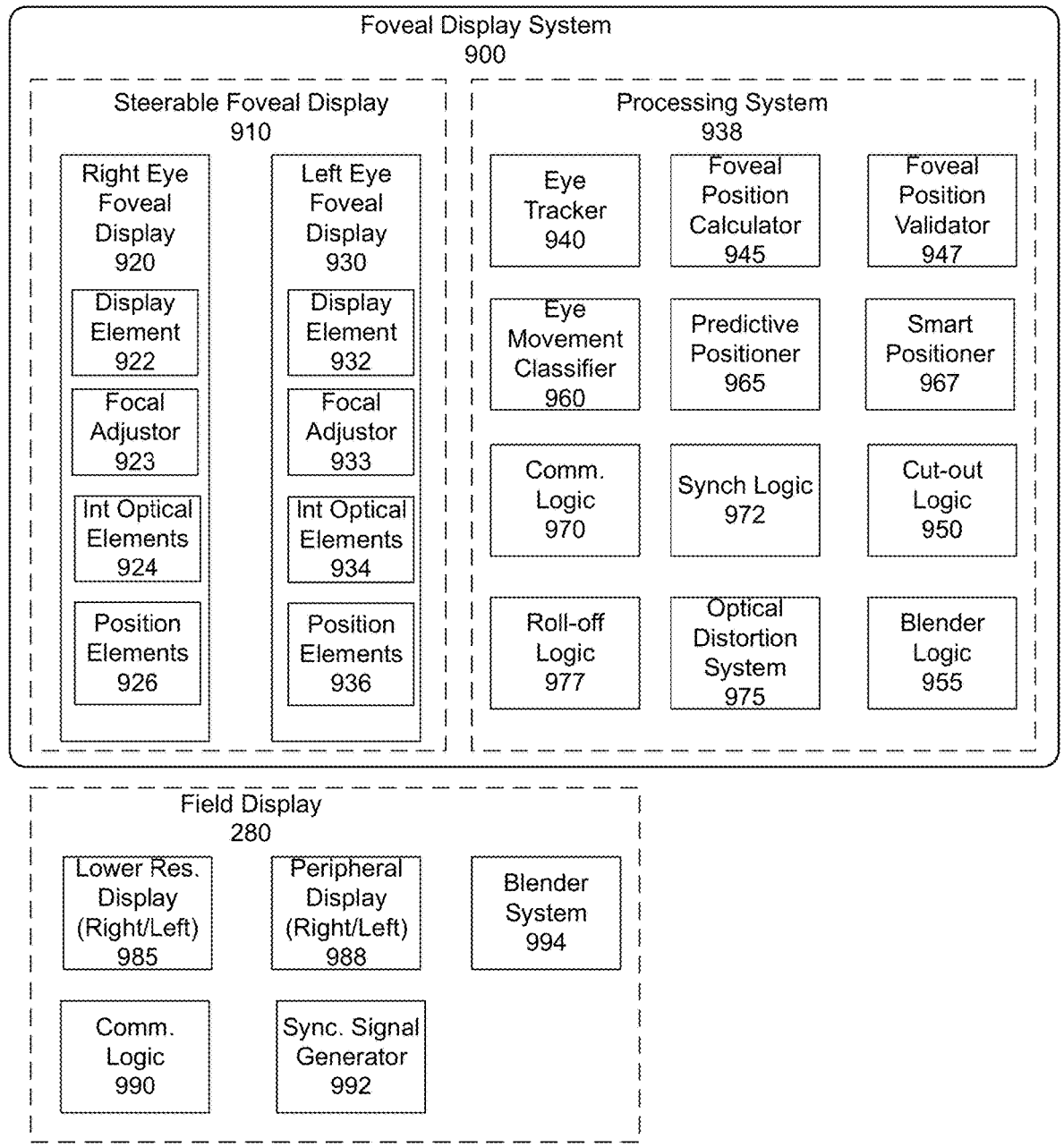
FIG. 9 is a block diagram of one embodiment of the system in which the present waveguide based optics may be used.

FIG. 9 illustrates one embodiment of the exemplary optical system 910, 980 and associated processing system 938. In one embodiment, the processing system may be implemented in a computer system including a processor. In one embodiment, the processing system 938 may be part of the display system. In another embodiment, the processing system 938 may be remote. In one embodiment, the optical system 910, 980 may be implemented in a wearable system, such as a head mounted display. The foveal image is presented to the user's eye through a right eye foveal display 920 and left eye foveal display 930, which direct the foveal display. In one embodiment, the foveal displays 920, 930 direct the foveal display image primarily toward the center of the field of view of the user's eye. In another embodiment, the image may be directed to a different location, as will be described below.

The foveal image for the right eye is created using a first display element 922. In one embodiment, the display element is a digital micromirror device (DMD). In one embodiment, the display element 922 is a scanning micromirror device. In one embodiment, the display element 922 is a scanning fiber device. In one embodiment, the display element is an organic light-emitting diode (OLED). In one embodiment, the display element 922 is a liquid crystal on silicon (LCOS) panel. In one embodiment, the display element 922 is a liquid crystal display (LCD) panel. In one embodiment, the display element 922 is a micro-LED or micro light emitting diode (µLED) panel. In one embodiment, the display element is a scanned laser system. In one embodiment, the system is a hybrid system with an off axis holographic optical element (HOE).

In one embodiment, the system includes a waveguide. In one embodiment, the waveguide is a multilayer waveguide. In one embodiment, the display element may include a combination of such elements.

In one embodiment, the first display element 922 is located in a near-eye device such as glasses or goggles. The resultant output may be virtual reality, augmented reality, or mixed reality.

The focus and field of view for the foveal display is set using intermediate optical elements 924. The intermediate optical elements 924 may include but are not limited to, lenses, mirrors, and diffractive, refractive, or reflective optical elements. In one embodiment, the focus of the virtual image is set to infinity. In another embodiment, the focus of the virtual image is set closer than infinity. In one embodiment, the focus of the virtual image can be changed. In one embodiment, the virtual image can have two or more focal distances perceived simultaneously.

In one embodiment, the foveal display image is directed primarily toward the center of the field of view of the user's eye. In one embodiment, the field of view (FOV) of the foveal display image is greater than 1 degree. In one embodiment, the FOV of the foveal display image is between 1 degree and 90 degrees. In one embodiment, the foveal display image may be larger than 5 degrees to address inaccuracies in eye tracking, provide the region needed to successfully blend such that the user cannot perceive the blending, and account for the time it takes to reposition the foveal display for the various types of eye movements.

In one embodiment, the system further includes a lower resolution field display image, which has a field of view of 90-220 degrees.

In one embodiment, the foveal display image is projected directly onto the user's eye using a set of one or more totally or partially transparent positioning elements 926. The positioning elements may include the steerable element, final optics, and waveguide(s) described above. In one embodiment, the positioning elements 926 include a steerable mirror. In one embodiment, the positioning elements 926 include a curved mirror. In one embodiment, the positioning elements 926 include a Fresnel mirror. In one embodiment, the positioning elements 926 include a diffractive element.

In one embodiment, the diffractive element is a surface relief grating. In one embodiment, the diffractive element is a volume hologram.

In one embodiment, the display 920 may include a focal adjustor 923, which enables the display to show image elements at a plurality of focal distances in the same frame. In one embodiment, the focal adjustor 923 may be an optical path length extender, as described in U.S. patent application Ser. No. 15/236,101 filed on Aug. 12, 2016.

A similar set of elements are present for the left eye foveal display 930. In one embodiment, the right eye foveal display 920 and the left eye foveal display 930 are matched. In another embodiment, they may include different elements.

In one embodiment, an eye tracker 940 tracks the gaze vector of the user, e.g. where the eye is looking. In one embodiment, the eye tracking system is a camera-based eye tracking system 940. In one embodiment, eye tracking system 940 is an infrared scanning laser with a receiving sensor. Other eye tracking mechanisms may be used. Foveal position calculator 945 determines a center of the user's field of view based on data from the eye tracking system 940.

In one embodiment, the adjustable positioning elements 926, 936 are used to adjust the foveal display 920, 930 to position the foveal image to be directed primarily toward the center of the field of view of the user's eye. In one embodiment, the direction of the image is adjusted by changing the angle of a mirror, one of the position elements 926, 936. In one embodiment, the angle of the mirror is changed by using electromagnetic forces. In one embodiment, the angle of the mirror is changed by using electrostatic forces. In one embodiment, the angle of the mirror is changed by using piezoelectric forces. In one embodiment, the adjustable element is the image source, or display element 922, 932 which is moved to position the image. In one embodiment, the foveal image is positioned to be directed to the center of the field of view of the user's eye. In another embodiment, another position element 926, 936 may be changed, such as a steering element 926, 936.

A field display 980 communicates with the processing system 938 via communication logics 970, 990. In one embodiment, there may be multiple displays. Here, two field displays are indicated, field display 985 and peripheral display 988. Additional levels of resolution may also be shown. In one embodiment, the field display 980 may include a single field display 985 viewed by both eyes of the user, or one field display per eye. In one embodiment, the field display 980 may have variable resolution.

In one embodiment, when the field display 980 is a separate system, sync signal generator 992 is used to synchronize the display of the independent foveal display 910 with the display of the field display 980. In one embodiment, the sync signal generator 992 is used to synchronize the adjustable mirror, or other positioning element of the foveal display with the field display. This results in the synchronization of the displays. In one embodiment, field display 980 includes blender system 994 to blend the edges of the foveal display image with the field display image to ensure that the transition is smooth.

In one embodiment, the lower resolution field display image is presented to the user with a fully or partially transparent optical system. In one embodiment, this partially transparent system includes a waveguide optical system. In one embodiment, this partially transparent system includes a partial mirror which may be flat or have optical power. In one embodiment, this partially transparent system includes a diffractive optical element. In one embodiment, this image is presented to the user through a direct view optical system.

In one embodiment, this partially transparent system includes inclusions to reflect or scatter light.

In one embodiment of the field display 980, an additional display sub-system is used to display images in the region of monovision peripheral view 988. In one embodiment, this sub-system is an LED array. In one embodiment, this sub-system is an OLED array. In one embodiment, this display sub-system uses a scanned laser. In one embodiment, this sub-system uses an LCD panel. In one embodiment, this sub-system has no intermediate optical elements to manipulate the FOV or focus of the image. In one embodiment, this sub-system has intermediate optical elements. In one embodiment, these intermediate optical elements include a micro-lens array.

The image data displayed by the steerable foveal display 910 and field display 980 are generated by processing system 938. In one embodiment, the system includes an eye tracker 940. In one embodiment, an eye tracker 940 tracks the gaze vector of the user, e.g. where the eye is looking. In one embodiment, the eye tracking system is a camera-based eye tracking system 940. Alternately, eye tracking system 940 may be infrared laser based. Foveal position calculator 945 determines a center of the user's field of view based on data from the eye tracking system 940.

The processing system 938 in one embodiment further includes foveal position validator 947 which validates the positioning of the position elements 926, 936, to ensure that the displays 920, 930 are properly positioned. In one embodiment, this includes re-evaluating the foveal display location with respect to the center of the field of view of the user's eye, in light of the movement of the foveal display. In one embodiment, the foveal position validator 947 provides feedback to verify that the positioning element has reached its target location, using a sensing mechanism. The sensing mechanism may be a camera, in one embodiment. The sensing mechanism may be gearing in one embodiment. The sensing mechanism may be another type of sensor that can determine the position of an optical element. In one embodiment, if the actual position of the foveal display is not the target position, the foveal position validator 947 may alter the display to provide the correct image data. This is described in more detail below.

In one embodiment, eye movement classifier 960 can be used to predict where the user's gaze vector will move. This data may be used by predictive positioner 965 to move the foveal display 920, 930 based on the next position of the user's gaze vector. In one embodiment, smart positioner 967 may utilize user data such as eye movement classification and eye tracking to predictively position the displays 920, 930. In one embodiment, smart positioner 967 may additionally use data about upcoming data in the frames to be displayed to identify an optimal positioning for the displays 920, 930. In one embodiment, smart positioner 967 may position the display 920, 930 at a position not indicated by the gaze vector. For example, if the displayed frame data has only a small amount of relevant data (e.g. a butterfly illuminated on an otherwise dark screen) or the intention of the frame is to cause the viewer to look in a particular position.

The processing system 938 may further include a cut-out logic 950. Cut-out logic 950 defines the location of the foveal display 920, 930 and provides the display information with the cut-out to the associated field display 980. The field display 980 renders this data to generate the lower resolution field display image including the cut-out of the corresponding portion of the image in the field display. This ensures that there isn't interference between the foveal image and field image. In one embodiment, when there is a cut-out, blender logic 955 blends the edges of the cut-out with the foveal image to ensure that the transition is smooth. In another embodiment, the foveal display may be used to display a sprite, a brighter element overlaid over the lower resolution field image. In such a case, neither the cut-out logic 950 nor blender logic 955 is necessary. In one embodiment, the cut-out logic 950 and blender logic 955 may be selectively activated as needed.

In one embodiment, the system may synchronize the foveal display 910 with an independent field display 980. In this case, in one embodiment, synchronization logic 972 synchronizes the displays. In one embodiment, the independent field display 980 is synchronized with the adjustable mirror, or other positioning element of the foveal display 910. This results in the synchronization of the displays. The field display 980 may receive positioning data. In one embodiment, there may not be a cut-out in this case.

In one embodiment, the processing system 938 may include an optical distortion system 975 for the foveal display 910 with distortion that increases from the center to the edge of the image. This intentional distortion would cause the pixels to increase in perceived size moving from the center of the foveal image to the edge. This change in perceived resolution would reduce the amount of processing required, as fewer pixels would be needed to cover the same angular area of the foveal display image.

Optical distortion may help with the blending between the foveal display 910 and the field display 980. In another embodiment, the foveal display 910 including the optical distortion system 975 could be used without a field display. It also provides for an easier optical design, and saves processing on the blending.

In one embodiment, the variable resolution highly distorted image has a large ratio between center and edge. The total FOV of this display would be large (up to 180 degrees).

In one embodiment, roll-off logic 977 provides a roll-off at the edges of the display. Roll-off in one embodiment may include resolution roll-off (decreasing resolution toward the edges of the display area). In one embodiment, this may be implemented with magnification by the optical distortion system 975. Roll-off includes in one embodiment brightness and/or contrast roll off (decreasing brightness and/or contrast toward the edges.) Such roll-off is designed to reduce the abruptness of the edge of the display. In one embodiment, the roll-off may be designed to roll off into "nothing," that is gradually decreased from the full brightness/contrast to gray or black or environmental colors. In one embodiment, roll-off logic 977 may be used by the foveal display 910 when there is no associated field display. In one embodiment, the roll-off logic 997 may be part of the field display 980, when there is a field display in the system.

Figure 10:
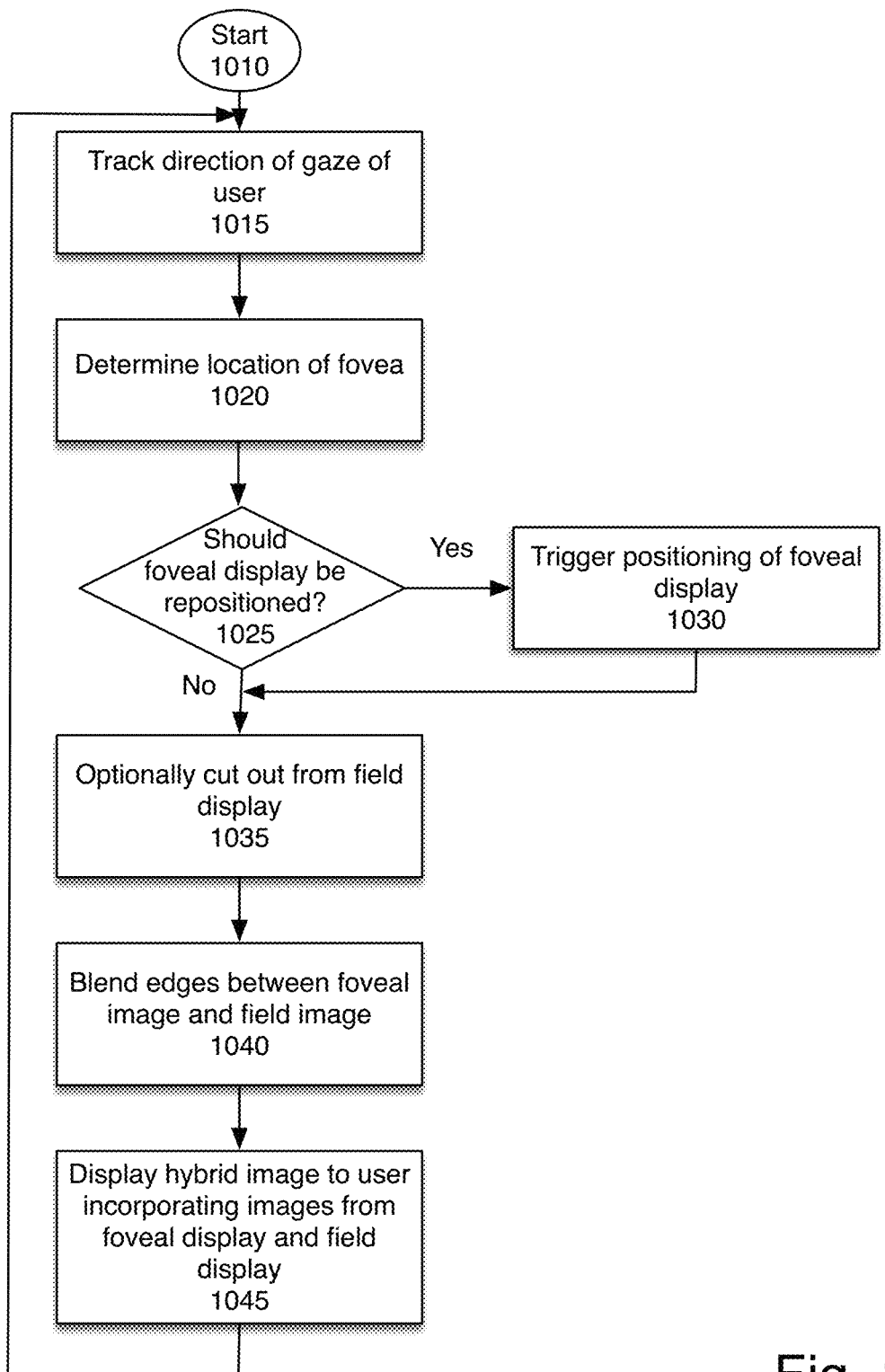
FIG. 10 is a flowchart of one embodiment of using the system.

FIG. 10 is a flowchart of one embodiment of utilizing the foveal display. The process starts at block 1010. In one embodiment, prior to the start of this process the display system is fitted to the user. This initial set-up includes determining the interpupillary distance (IPD) and any prescription needed, to ensure that the "baseline" display for the user is accurate.

At block 1015, the user's eyes are tracked. In one embodiment, an IR camera is used for tracking eyes. In one embodiment, eye tracking identifies the gaze vector of the user, e.g. where the user is focused. The eye tracking may identify left and right eye gaze vector/angle, and gaze center (derived from the L/R eye gaze vectors). The eye tracking may determine the location (X, Y, Z) and orientation (roll, pitch, yaw) of the left and right eyes relative to a baseline reference frame. The baseline reference frame is, in one embodiment, established when the display is initially fitted to the user and the user's interpupillary distance, diopters, and other relevant data are established.

At block 1020, the location of the fovea is determined based on the gaze vector data. In one embodiment, the fovea location includes coordinates (X, Y, Z) and orientation (roll, pitch, yaw) for each eye.

At block 1025, the process determines whether the foveal display should be repositioned. This is based on comparing the current position of the foveal display with the user's gaze vector or the intended position of the foveal image. If they are misaligned, the system determines that the foveal display should be repositioned. If so, at block 1030, the display is repositioned. In one embodiment, if the foveal display is moved more than a particular distance, the display is turned off during the move. This ensures that the user does not perceive the movement. In one embodiment, the particular distance is more than 0.5 degrees. In one embodiment, the foveal display is not turned off if the movement is occurring while the user is blinking. Note that although the term "repositioning" is used, this does not generally mean that there is a physical movement of the eye pieces. In one embodiment, a mirror or other optical elements which position the display are used to alter the center positioning of the foveal image. The process then continues to block 1035, whether or not the display was repositioned.

At block 1035, optionally the system cuts out the portion of the field display that would be positioned in the same location as the foveal display. This prevents the field display from interfering with the foveal display. The cut-out, in one embodiment, is performed at the rendering engine. In another embodiment, the foveal image may be a sprite or other bright image element which does not need a cut-out to be clear. In that instance, this block may be skipped. In one embodiment, the cut-out is skipped if the user eye tracking indicates that the user's gaze has moved substantially from the baseline reference. The baseline reference is the user's default gaze position, from which the movement of the gaze is tracked. A substantial movement from the baseline reference means that the system cannot determine the user's correct gaze position. In this instance, in one embodiment, the foveal image may be dropped, or the foveal display may be turned off momentarily.

At block 1040, in one embodiment, the edges between the foveal image and the field image are blended. This ensures a smooth and imperceptible transition between the field image and the foveal image. At block 1045, the hybrid image is displayed to the user, incorporating the foveal display and the field display. The process then returns to block 1010 to continue tracking and displaying. Note that while the description talks about a foveal image and a field image, the images contemplated include the sequential images of video.

Figure 11:
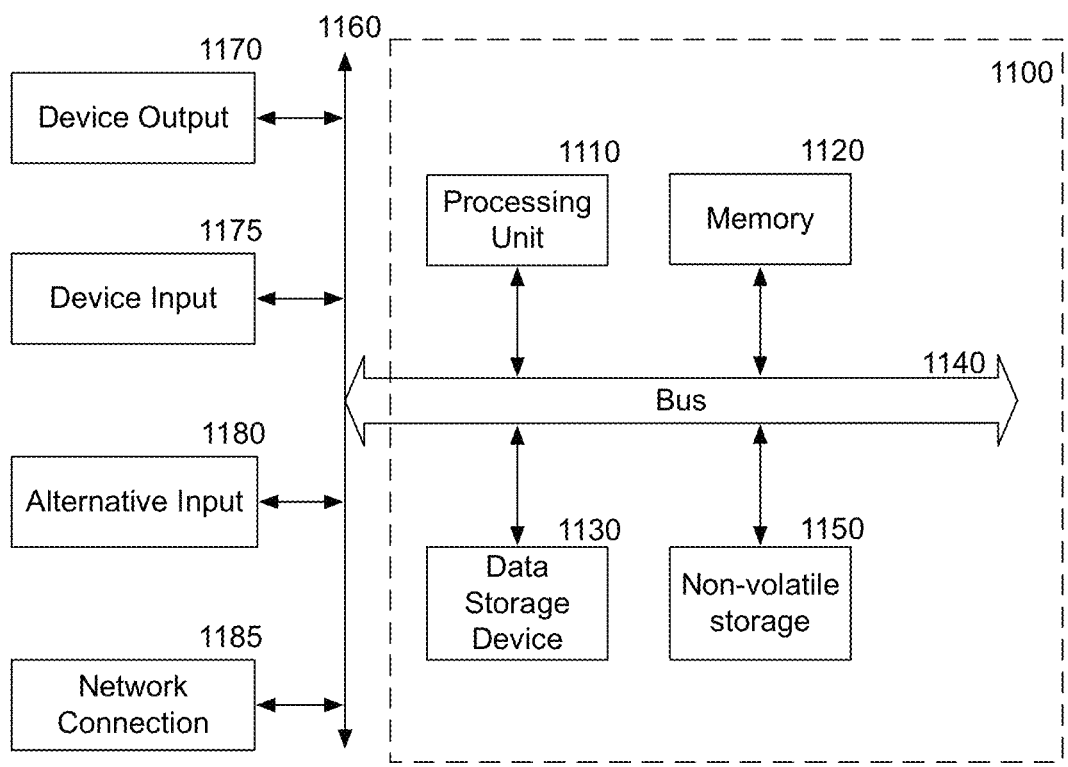
FIG. 11 is a block diagram of a computer system in which may be used with the present system.

FIG. 11 is a block diagram of one embodiment of a computer system that may be used with the present invention. It will be apparent to those of ordinary skill in the art, however that other alternative systems of various system architectures may also be used.

The data processing system illustrated in FIG. 11 includes a bus or other internal communication means 1140 for communicating information, and a processing unit 1110 coupled to the bus 1140 for processing information. The processing unit 1110 may be a central processing unit (CPU), a digital signal processor (DSP), or another type of processing unit 1110.

The system further includes, in one embodiment, a random access memory (RAM) or other volatile storage device 1120 (referred to as memory), coupled to bus 1140 for storing information and instructions to be executed by processor 1110. Main memory 1120 may also be used for storing temporary variables or other intermediate information during execution of instructions by processing unit 1110.

The system also comprises in one embodiment a read only memory (ROM) 1150 and/or static storage device 1150 coupled to bus 1140 for storing static information and instructions for processor 1110. In one embodiment, the system also includes a data storage device 1130 such as a magnetic disk or optical disk and its corresponding disk drive, or Flash memory or other storage which is capable of storing data when no power is supplied to the system. Data storage device 1130 in one embodiment is coupled to bus 1140 for storing information and instructions.

The system may further be coupled to an output device 1170, such as a cathode ray tube (CRT) or a liquid crystal display (LCD) coupled to bus 1140 through bus 1160 for outputting information. The output device 1170 may be a visual output device, an audio output device, and/or tactile output device (e.g. vibrations, etc.)

An input device 1175 may be coupled to the bus 1160. The input device 1175 may be an alphanumeric input device, such as a keyboard including alphanumeric and other keys, for enabling a user to communicate information and command selections to processing unit 1110. An additional user input device 1180 may further be included. One such user input device 1180 is cursor control device 1180, such as a mouse, a trackball, stylus, cursor direction keys, or touch screen, may be coupled to bus 1140 through bus 1160 for communicating direction information and command selections to processing unit 1110, and for controlling movement on display device 1170.

Another device, which may optionally be coupled to computer system 1100, is a network device 1185 for accessing other nodes of a distributed system via a network. The communication device 1185 may include any of a number of commercially available networking peripheral devices such as those used for coupling to an Ethernet, token ring, Internet, or wide area network, personal area network, wireless network or other method of accessing other devices. The communication device 1185 may further be a null-modem connection, or any other mechanism that provides connectivity between the computer system 1100 and the outside world.

Note that any or all of the components of this system illustrated in FIG. 11 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1120, mass storage device 1130, or other storage medium locally or remotely accessible to processor 1110.

It will be apparent to those of ordinary skill in the art that the system, method, and process described herein can be implemented as software stored in main memory 1120 or read only memory 1150 and executed by processor 1110. This control logic or software may also be resident on an article of manufacture comprising a computer readable medium having computer readable program code embodied therein and being readable by the mass storage device 1130 and for causing the processor 1110 to operate in accordance with the methods and teachings herein.

The present invention may also be embodied in a handheld or portable device containing a subset of the computer hardware components described above. For example, the handheld device may be configured to contain only the bus 1140, the processor 1110, and memory 1150 and/or 1120.

The handheld device may be configured to include a set of buttons or input signaling components with which a user may select from a set of available options. These could be considered input device #1 1175 or input device #2 1180. The handheld device may also be configured to include an output device 1170 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1110, a data storage device 1130, a bus 1140, and memory 1120, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1185.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1110. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A system comprising:
    a foveal display panel comprising a plurality of micro-LEDs;
    a waveguide;
    a beam splitter/combiner;
    a first light path for a foveal image element, the first light path including first optics to receive light from the foveal display panel forming the foveal image element, a steerable element to steer a position of the foveal image element to a particular orientation, intermediate optics to produce a virtual foveal image, the beam splitter/combiner, and a final optics to direct the foveal image element to an in-coupling region of the waveguide, wherein the virtual foveal image is produced prior to the beam splitter/combiner;
    a second light path for a field image element, the second light path including the beam splitter/combiner and the final optics.

2. The system of claim 1, further comprising:
    a field display panel, an output of the field display panel passing through the second light path; and
    the beam splitter/combiner working as a beam combiner, to combine the light from the foveal display panel with light from a field display panel prior to entry of the light into the final optics.

3. The system of claim 1, wherein the beam splitter/combiner is one of:
    a polarized beam splitter working in reverse and a partial mirror.

4. The system of claim 1, further comprising:
    one or more mirrors to redirect light.

5. The system of claim 1, further comprising:
    a single display panel having a first half and a second half, wherein light from the first half of the single display panel is directed through the first light path, and the light from the second half of the single display panel is directed through the second light path.

6. The system of claim 5, further comprising:
    a first polarization filter of a first type of polarization over the first half of the single display panel;
    a second polarization filter of a second type of polarization over the second half of the single display panel;
    the beam splitter/combiner working as a polarized beam splitter, wherein light with the first type of polarization passes through the polarized beam splitter prior to the first optics of the first light path, and passes through the polarized beam splitter a second time, prior to entering the final optics; and
    light with the second type of polarization is reflected by the polarized beam splitter toward the final optics of the second light path.

7. The system of claim 6, further comprising a plurality of mirrors to direct the light along the first light path.

8. The system of claim 1, further comprising:
    a single display panel, the single display panel including the foveal display panel and a field display panel;
    a polarization filter;
    a polarization modulator;
    the beam splitter/combiner working as a polarized beam splitter;
    wherein light with a first polarization passes through the polarized beam splitter prior to entering the first optics of the first light path, and light with a second polarization is reflected by the polarized beam splitter prior to entering the final optics in the second light path.

9. The system of claim 8, wherein the single display panel alternates displaying field image elements and foveal image elements, producing a time sequential split.

10. The system of claim 8, further comprising a plurality of mirrors to direct the light along the first light path.

11. The system of claim 1, wherein the first optics comprise a steering cube, the steering cube, including a polarized beam splitter, the light entering the steering cube passing through multiple sides of the steering cube, prior to exiting the steering cube toward the intermediate optics.

12. A method of generating a hybrid image comprising:
receiving light from a foveal display panel, the light comprising a foveal image element;
directing the foveal image element through a first light path, the first light path including first optics, a steerable element to steer a position of the foveal image element to a particular orientation, intermediate optics, a beam splitter/combiner, and final optics, the first light path directing the foveal image element to an in-coupling region of a waveguide;
generating a virtual foveal image in the first light path prior to the beam splitter/combiner;
receiving light from a field display panel, the light comprising a field display element; and
directing the field display element through a second light path, the second light path including the beam splitter/combiner and the final optics.

13. The method of claim 12, wherein the foveal display panel comprises a plurality of micro-LEDs.

14. The method of claim 12, further comprising:
the beam splitter/combiner working as a beam combiner, to combine the light from the foveal display panel with light from a field display panel prior to entry of the light into the final optics.

15. The method of claim 12, wherein the foveal display panel and the field display panel comprise a single display panel, the method comprising:
directing light from a first portion of the single display panel through the first light path; and
directing light form a second portion of the single display panel through the second light path.

16. The method of claim 15, further comprising:
polarizing the light to a first type of polarization using a first polarization filter over the first portion of the single display panel;
polarizing the light to a second type of polarization using a second polarization filter over the second portion of the single display panel;
wherein the beam splitter/combiner operates as a polarized beam splitter, such that light with the first type of polarization passes through the polarized beam splitter prior to the first optics of the first light path, and passes through the polarized beam splitter a second time, prior to entering the final optics; and
reflecting light with the second type of polarization by the polarized beam splitter toward the final optics of the second light path.

17. The method of claim 12, wherein the foveal display panel and the field display panel comprise a single display panel, and the beam splitter/combiner comprises a polarized beam splitter, the method comprising:
passing the light with a first polarization through the polarized beam splitter prior to entering the first optics of the first light path; and
reflecting the light with a second polarization by the polarized beam splitter prior to entering the final optics in the second light path.

18. The method of claim 17, wherein the single display panel alternates displaying field image elements and foveal image elements, producing a time sequential split.

19. The method of claim 12, wherein the first optics comprise a steering cube, the steering cube, including a polarized beam splitter, the method further comprising the light entering the steering cube passing through multiple sides of the steering cube, prior to exiting the steering cube toward the intermediate optics.

20. A system comprising:
a display panel comprising a plurality of micro-LEDs;
a waveguide;
a beam splitter/combiner;
a first light path for a foveal image element, the first light path including first optics, a steerable element to steer a position of the foveal image element to a particular orientation, intermediate optics to produce a virtual foveal image, the beam splitter/combiner, and a final optics to direct the foveal image element to an in-coupling region of the waveguide, wherein the virtual foveal image is produced prior to the beam splitter/combiner;
a second light path for a field image element, the second light path including the beam splitter/combiner and the final optics;
wherein the display panel outputs one or more of: the foveal image element and the field image element.

* * * * *